United States Patent [19]

Anderson et al.

[11] Patent Number: 4,621,591
[45] Date of Patent: Nov. 11, 1986

[54] COMBINATION COLLAR AND MUZZLE HUMANE TRAINING AID

[75] Inventors: Robert K. Anderson, Roseville; Ruth E. Foster, Minneapolis; Jeffrey A. Levine, Bloomington, all of Minn.

[73] Assignee: Regents of the University of Minnesota, Minneapolis, Minn.

[21] Appl. No.: 719,697

[22] Filed: Apr. 4, 1985

[51] Int. Cl.⁴ .............................................. A01K 25/00
[52] U.S. Cl. ....................................... 119/130; 54/24; 54/15
[58] Field of Search ............... 119/106, 129, 130, 132; 54/6 A, 15, 24

[56] References Cited

U.S. PATENT DOCUMENTS

| | | | |
|---|---|---|---|
| 179,898 | 7/1876 | Cronin | 54/24 |
| 428,898 | 5/1890 | Duncan | 54/24 |
| 660,494 | 10/1900 | Evans | 54/24 |
| 904,321 | 11/1908 | Farrar | 54/24 |
| 964,947 | 7/1910 | Varney | 54/24 |
| 3,949,538 | 4/1976 | Woodruff | 54/24 |
| 4,337,610 | 7/1982 | Taylor | 54/24 |
| 4,369,615 | 1/1983 | Bloodworth | 54/24 |
| 4,472,925 | 9/1984 | Woodruff | 54/24 |
| 4,480,589 | 11/1984 | Schneider | 119/106 |
| 4,483,275 | 11/1984 | De Groot | 119/130 |

Primary Examiner—Robert P. Swiatek
Attorney, Agent, or Firm—Kinney & Lange

[57] ABSTRACT

A combination collar and muzzle is used as a humane method of restraining, controlling, and achieving obedient behavior of animals, dogs in particular. A collar member or loop encircles the neck immediately behind the ears, and a second loop encircles the upper and lower jaws of the animal to form a type of a figure eight combination collar and muzzle. The two loops are coupled together with a ring behind the jaw. The loops are slidably connected so that when a leash is attached to the portion of the muzzle loop extending out from the connecting ring it will slide easily and at the same time will exert a downward pressure on the neck immediately behind the ears. Pressure is thus simultaneously applied to nerves and muscles tending to control the dog humanely and without choking or applying pressure to the trachea and larynx. The simultaneous pressure serves to calm and control the dog in a precise and effective manner without injury or choking and achieves precise, active and effective control and calmness without injuring the dog.

7 Claims, 6 Drawing Figures

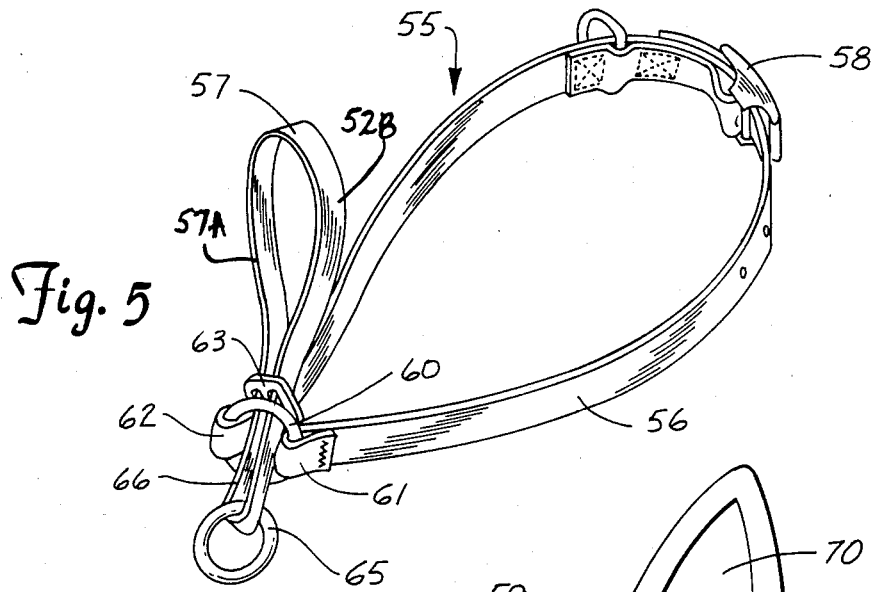
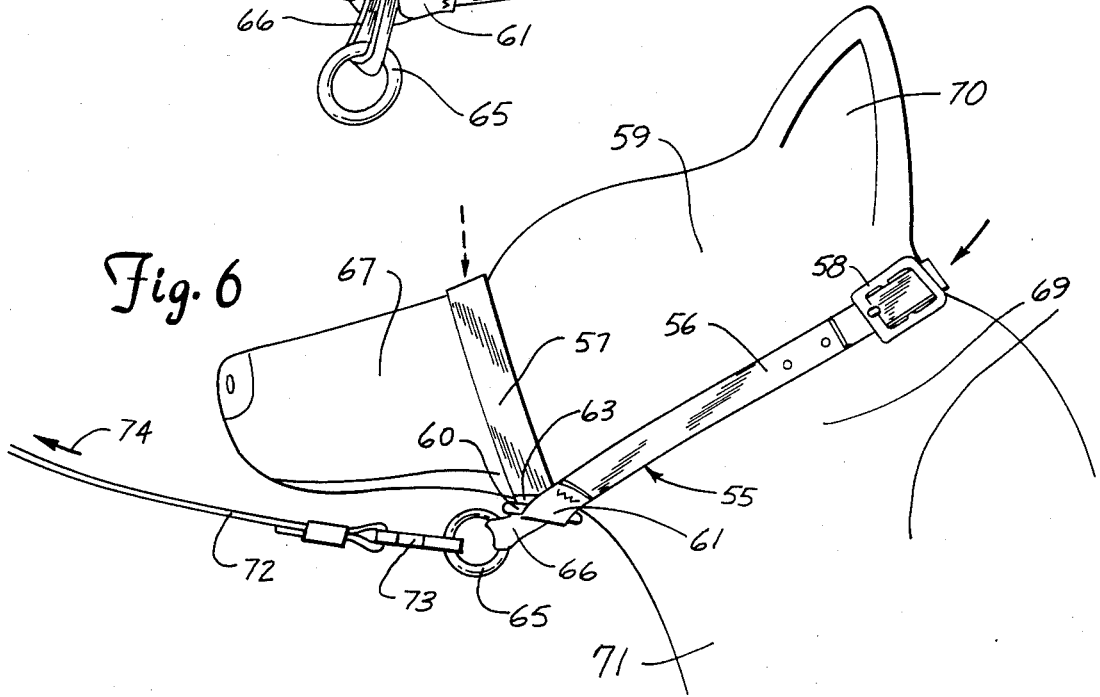

COMBINATION COLLAR AND MUZZLE HUMANE TRAINING AID

BACKGROUND OF THE INVENTION

1. Field of the Invention

The present invention relates to training aids used for controlling and achieving obedient behavior of animals, dogs in particular.

2. Description of the Prior Art

In the prior art various types of muzzles and collars have been used in attempts to achieve dog control, including a metal choke chain collar which encircles the neck and tightens down to tend to choke the dog as control pressure is applied through a leash. This choke collar applies pressure to the skin and muscles of the neck as well as to the larynx and trachea producing pain and interfering with the breathing. Severe injury can result, particularly to the trachea and larnyx and the collar may slip down toward the body of the dog to a position on the neck where the collar is not in contact with the muscles and nerves most suitable for controlling animal behavior.

Additionally, there are prong collars that have metal prongs or points that press against the skin of the neck producing pain at the pressure points, which can cause injury as well as great pain. Snap around choke collars have been used to fit around the neck, but, again, these do not control the muzzle and can produce injury to the trachea and/or larynx. There are traditional muzzles to encase the nose and lower jaw of a dog but they do not apply any variable pressure and merely keep the mouth from being opened sufficiently to prevent dogs for biting people. Muzzles are not helpful for obedience training.

Various halters also have been advanced for dog control, but they generally do not change in size or shape to aid the handler in applying variable pressure to nerves and muscles which aid in controlling or obtaining obedience from the dog.

The prior art includes a device called a "K-9 Kumalong Halter". This device is shown in U.S. Pat. No. 4,483,275, issued Nov. 20, 1984 to Alice A. De Groot. The halter has an integral leash on a muzzle loop as shown in FIG. 1 of the patent which will tend to tighten upon pulling on the leash, but the way the device is constructed the neck band does not apply appropriate pressure to the sensitive areas of the neck that achieve dog control and obedience without injuring the dog. An intermediate strap is used between a neck band or collar and the muzzle loop and leash, and thus control pressures are ndt directly applied to the neck upon modest pulling forces on the leash in the proper direction.

U.S. Pat. No. 4,337,610, issued to Earl Taylor on July 6, 1982 shows an animal control halter which is somewhat similar to the previously described device shown in U.S. Pat. No. 4,483,275, and discloses a halter of somewhat conventional form except that it has a device to tighten the muzzle loop down onto the nose of the animal. The tightening is achieved indirectly by tightening around the lower side of the animal's jaw, rather then applying pressure directly.

U.S. Pat. No. 4,472,925, issued Sept. 25, 1984 to Dale Woodruff also shows a training halter that has various tightenable sections, but because of its arrangement for tightening the head loop, that is the loop that forms the collar, and for tightening only indirectly of the muzzle or nose loop (this device is designed primarily for horses), pressure for control is not achieved directly. In fact, the head loop for the horse does not encircle the neck just behind the jaws as does the present device. Thus the device of U.S. Pat. No. 4,472,925 does not provide for behavior control by applying modest pressure to the muscles and nerves which tend to influence the animal behavior the most.

A similar device is shown in U.S. Pat. No. 3,949,538, issued Apr. 13, 1976 to Dale Woodruff.

U.S. Pat. No. 4,369,615 also shows an animal halter made of rope, which provides means for tightening a head or neck loop and muzzle, but without direct, simultaneous control on both of the loops. The muzzle loop is not directly tightenable in this device, and pulling on the leash tends to provide forces which will skew the halter, unless the leash is pulled downwardly, which is difficult when using the device with dogs.

SUMMARY OF THE INVENTION

The present invention relates to a combination collar and muzzle that achieves obedient and companionable behavior of dogs as well as other animals by providing two loops (a collar loop and a muzzle loop) which will be simultaneously tightened down onto the back and sides of the neck and to the front of the muzzle through a slip connection that provides direct control of variable pressure through a leash held by the animal handler. The two loops join at the rear of the jaw, that is under the lower jaw, and are slidably connected through a provided ring so that direct pressure is applied from the leash directly to the muzzle loop against the front of the muzzle, and at the same time the positioning of the collar or neck loop insures that direct pressure is simultaneously applied to the animal's neck, immediately behind its ears, to obtain control and obedience.

The collar or neck loop is adjusted to snugly fit around the neck, immediately behind the head and ears of the dog, and ends in a slip connection, such as a metal ring, underneath the animal's jaw. The muzzle loop passes through this ring and loops over the muzzle. The ring is of size so the muzzle loop freely slides through the ring, but preferably there is a divider bar in the ring that prevents the two loops from separating. A leash is applied to a second ring on the muzzle loop below the ring on the collar. Thus, by permitting the muzzle loop to loosen the dog can pant, but for safety purposes the muzzle loop can be held closed by leash pressure so that the dog cannot open its jaws sufficiently to bite. Upon pulling on the leash to exert greater pressure, particularly in a forward direction, the muzzle loop tightens down to apply pressure to the muzzle and simultaneously through the connecting ring between the two loops, to the back and sides of the neck and effectively closing the upper and lower jaws and applying control pressures in a humane manner without applying any pressure to the trachea and larynx.

The muzzle loop and collar loop preferably are made of materials that do not injure the skin, and the unit is quickly and easily applied and provides for a detachable leash so that the dog can be permitted to run free for obedience exercises, and immediately be recontrolled by attaching the leash and operating the collar and muzzle.

BRIEF DESCRIPTION OF THE DRAWINGS

FIG. 5 is a layout of a third form of the present invention; and

FIG. 6 is a side elevational view of a long muzzled dog having a combination collar and muzzle training aid made according to the third form of the present invention installed thereon.

DETAILED DESCRIPTION OF THE PREFERRED EMBODIMENTS

Figure 1:
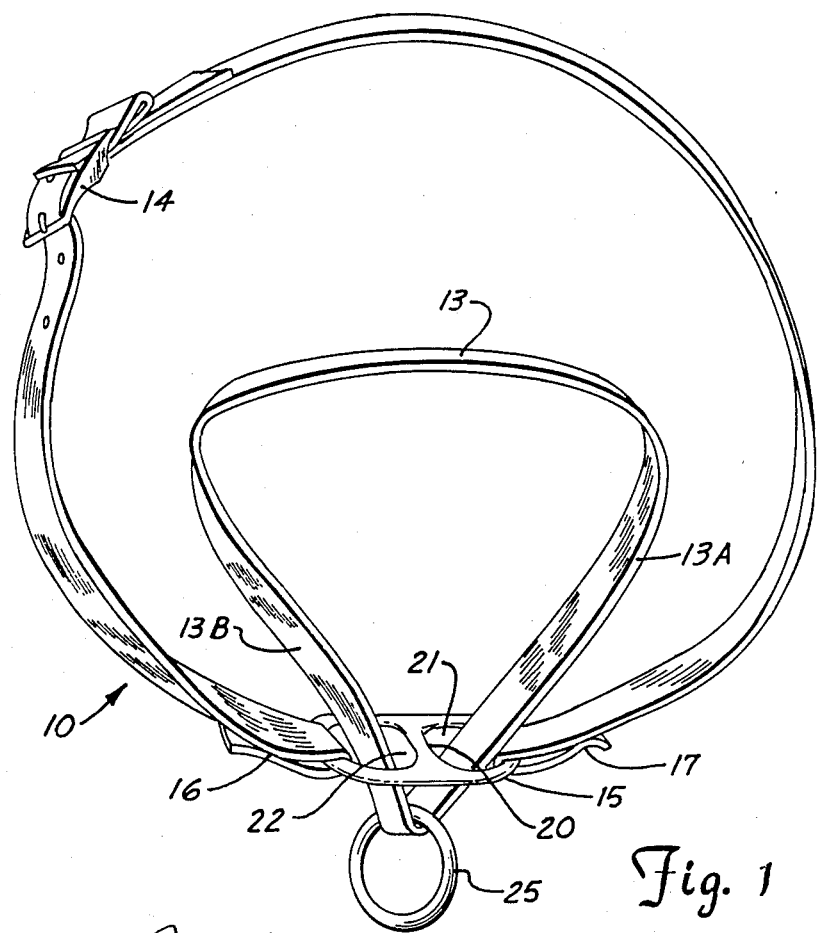
FIG. 1 is a layout of a combination collar and muzzle training aid made according to the present invention illustrating the individual parts.
Figure 2:
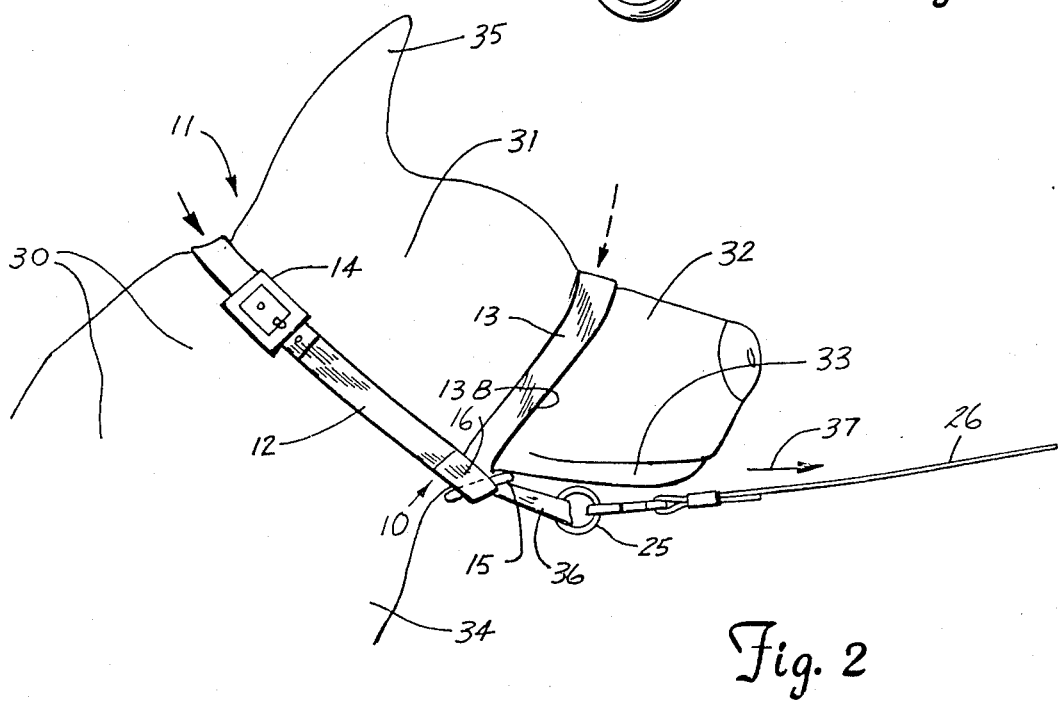
FIG. 2 is a side view of a combination collar and muzzle training aid made according to the present invention shown on the head of a dog.

As shown in FIGS. 1 and 2, a combination collar and muzzle training aid is illustrated generally at 10, and in FIG. 2 it is mounted onto the head and neck of a dog indicated at 11. The combination collar and muzzle training aid includes a collar or neck loop 12 and a muzzle loop 13. An adjustable fastener 14 (such as a buckle) is used with the collar loop, so that the size of the collar loop can be adjusted to snugly fit the neck of the dog. A connecting ring indicated generally at 15 is attached to the collar loop. As shown, the connecting ring 15 is integrally fastened to and forms part of the collar loop. The ring 15 is connected to ends of sections of the flexible collar band as shown at 16 and 17, on opposite sides of the ring 15. The ring 15 is an oval ring that has a central divider bar 20 to form two side openings 21 and 22. The two lengths indicated at 13A and 13B of the muzzle loop 13 pass through the openings 21 and 22 on opposite sides of the center bar 20, respectively, and the lengths of the muzzle loop are freely slidable in the two side openings of ring 15. A snap receiving ring shown at 25 is also slidably mounted on the muzzle loop 13, below ring 15 for attachment of a leash 26 shown in FIG. 2. The ring 25 slides freely for self adjustment when the leash is pulled.

The dog 11, as shown, has a neck 30, a head 31, a muzzle 32, a lower jaw 33, and a throat 34.

In installation the collar loop 12 is placed around the neck 30 of the dog and adjusted with the buckle or adjustable fastener 14. Preferably the collar loop and the muzzle loop are made of a strong Nylon web material, but can be made of other flexible materials that can be adjusted in length. The collar loop 12 is made to fit snugly around the throat, but not sufficiently tight to cause choking. The collar loop is placed just behind the ears 35 of the dog and extends behind the head and jaw. The ring 15, as can be seen is under the neck at the rear end of the dog's lower jaw. In FIG. 2 the leash is under tension and the collar loop and muzzle loop are tightened down. On a dog, as shown in FIG. 2, there is a natural recess between the neck and the rear of the lower jaw for positioning of the collar loop 12. The muzzle loop 13 is looped over the muzzle 32 of the dog. The lower portion of the muzzle loop indicated at 36, which extends below the ring 15, carries the leash ring 25 on the outside of the ring 15, but the side lengths 13A and 13B (13B is shown in FIG. 2) are freely slidably passed through the openings 21 and 22. As can be seen in FIG. 2 as soon as pressure is applied to the lower portion 36 of the muzzle loop by pulling on the leash, for example, forwardly as shown by arrow 37, the muzzle loop will exert a force against the upper surfaces of the muzzle and ring 15 will move against the lower jaw. When forces are applied in the direction shown in FIG. 2 generally along the leash there will be also be a simultaneous force created by the sliding of the collar loop 12 against the neck on the upper portions of the neck as the ring 15 is pulled by the leash. There thus is pressure on the two most important animal control pressure points, namely the muzzle and the top of the neck immediately behind the ears where nerves and muscles are located.

One of the features is that the pressure to the muscles and nerves takes advantage of the generally accepted theory that comes from research on horses (which provides indirect evidence of similar neurophysiologic effects in dogs) that the pressure on the nerves and tissues causes release of neurotransmitters which appear to have a paliative or calming effect. The calming effect aids in humane control without injury to tissues, nerves or organs of the animal when properly applied.

The collar has a very simple geometric form as shown in FIG. 1, such as a "figure 8" when the two loops are laid out. The loops are slidably joined in the center and with the muzzle loop freely slidable in the oval, center bar ring 15 held by the collar loop. By the application of pressure on the leash in substantially any direction, pressure is simultaneously applied in areas that provide effective control, which from indirect evidence is believed to be related to neurophysiologic action and the release of paliative and calming neurotransmitters.

Figure 3:
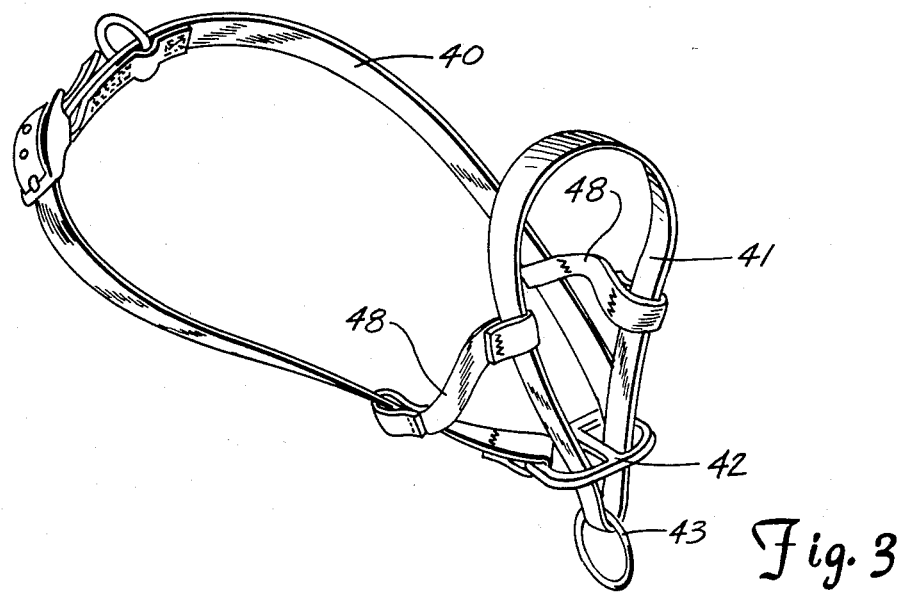
FIG. 3 is a layout of a second form combination collar and muzzle of the present invention.
Figure 4:
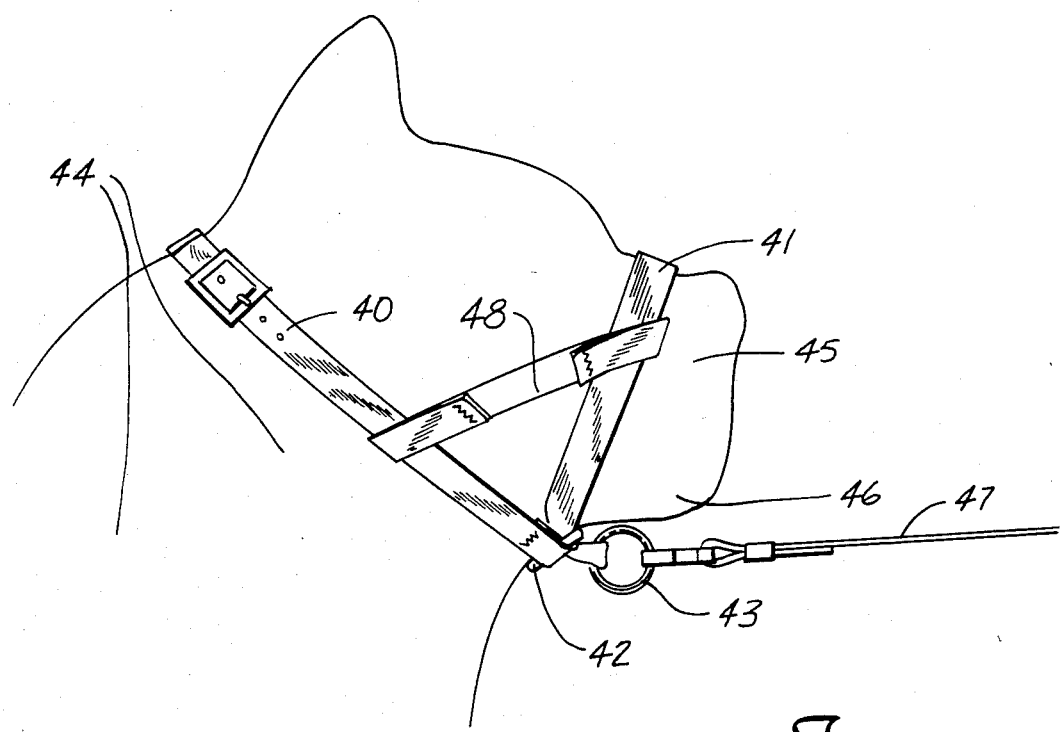
FIG. 4 is a side view of the second form of the combination collar and muzzle of the present invention shown being worn by a short muzzled dog.

In FIGS. 3 and 4, a modified form of the invention is shown. The modified device has a collar loop 40, a muzzle loop 41, a center bar, oval ring 42, and a leash ring 43 that are coupled together in the same manner as previously explained. In other words, pulling on the leash 47 simultaneously applies pressure to the neck 44 of an animal, in this case a dog with a short muzzle. The muzzle 45 of this dog is quite short, and there is a chance that a loop, such as loop 41, might slip off the lower jaw indicated at 46 (or be moved by a dog pawing it off), so slidable stabilizers 48 are provided joining the collar loop and the muzzle loop along the sides of the dog's head. The stablizers 48 comprise straps on opposite sides of the dog's head made of the same material as the collar loop and muzzle loop. Each strap 48 has loops at its ends which slidably receive the collar loop at one end and the muzzle loop at the other end.

The same action previously described is achieved with the training aid of FIGS. 3 and 4. There is no impediment to the tightening action from the stablizer straps 48 which are slidable at each end between the collar loop and the muzzle loop. The straps 48 do prevent the muzzle loop from sliding off the muzzle 45 of the short muzzle dog shown.

The pulling of the leash 47 again will simultaneously apply pressure, both to the muzzle of the dog and to the neck of the dog immediately behind the ears to provide the control pressures that bring about obedience and satisfactory behavior in the animal.

The collar loop shown in FIG. 4 is adjusted so that it snugly fits the neck of the dog, but does not apply pressure that will injure the trachea, larynx, or the skin.

The adjustable stabilizers 48 may be semi-rigid or flexible as desired, and will prevent a dog that tries to remove the muzzle loop with its paws from doing so, as well as being desirable for the short muzzle dog shown.

A third form of the present invention is shown in FIGS. 5 and 6, and is adapted for use under certain circumstances where a plain ring is desired for under the neck 69 of the dog 59. A combination collar and muzzle training aid illustrated generally at 55 includes a collar or neck loop 56 and a muzzle loop 57. An adjustable fastener 58 is used as in the previous forms of the invention. The size of the collar loop can thus be adjusted to snugly fit the neck 69 of the dog 59. A connecting ring 60, comprising an ordinary open ring is connected to the side members of the collar loop 56, as at 61 and 62. This ring 60 is merely an open ring in this form of the invention, and is of size to permit the muzzle loop 57 to slide freely through the ring.

The muzzle loop side lengths or portions 57A and 57B are formed to slide through a separate ring shown at 63, which has a center bar as was shown in the first form of the invention for the ring 15, but ring 63 merely rests against the ring 60, underneath the jaw of the dog. The ring 63 has large enough openings along the sides so that the lengths 57A and 57B slide freely through the ring, but the center bar keeps the collar and muzzle loops from separating.

A freely slidable leash attaching ring 65 is connected to a portion of the muzzle loop 66 that extends below the ring 60, as shown in FIG. 6 when the combination collar and muzzle training aid 55 are installed on a dog.

As shown, the dog 59 has a long muzzle 67, and thus the loop is adjusted to fit again under the lower jaw 68, near the rear, as shown, with the neck or collar loop 56 immediately behind the ears 70 of the dog on the dog's neck 69. The collar loop is adjusted to be fairly snug up under the throat 71 of the dog, but not to choke the dog in any manner.

A leash 72 is fastened with a suitable snap 73 to the ring 65, and it can be seen that this same type of action is achieved when the leash is pulled as shown by the arrow 74. There will be pressure applied to the neck of the dog immediately behind the ears, and the muzzle loop will tighten down onto the upper part of the muzzle 67. This will effectively provide pressures for adequate control as previously explained.

The use of the ring 63, and a separate ring 60 keeps the muzzle lengths 57A and 57B from twisting, and insures that there will be pressure downwardly on both sides of the jaws without any twisting of the muzzle loop as it is tightened.

The humane aspects of the present training aid have been demonstrated in use, and the advantages of the recognized neurophysiologic action, as well as the anatomic action on the neck provide for adequate control. Neurotransmitters to the brain are affected, as shown by indirect evidence with other animals, for calming and control in a humane manner.

Thus, in summary, the device of the present invention in all its forms provides direct control of variable pressure that is applied simultaneously to the back and sides of the neck and the upper and lower jaws, without choking or applying choking pressure to the sensitive areas under the neck, such as the trachea and larynx, when the leash is tightened. The muzzle loop is of size to permit the dog to pant when loose, but can quickly be tightened to prevent a dog from biting when the leash pressure is applied. The simultaneous pressure applied to the collar and the muzzle, insures that the dog's jaws can be kept tightly closed if desired. The training aid provides more humane, but precise and effective restraint to aid control and achieve obedient behavior of any dog, regardless of size, temperment or behavior. When a handler pulls appropriately on the leash, pressure is provided to the desired area of muscles and nerves at the back of the neck, immediately behind the ears, and to the sides of the neck and is actively controlled to give a neurophysiologic action as explained, tending to provide calming neurotransmitters to the brain for control. The action is not mechanical as with other collars. The pressure to these anatomical areas of the neck behind the ears is easily controlled and there is no excessive force required to tend to injure the skin or organs of the dog.

The humane control is provided precisely and effectively by the amount of pressure applied by pulling the leash in any direction to achieve obedient behavior of any dog, large or small and regardless of temperament, that is, whether or not the dog is vicious, rambunctious, boisterous, assertive, reluctant or fearful.

Many kinds of materials, such as leather, as well as nylon strapping, plastic, flexible metal and other suitable materials can be utilized for the figure eight design of the combination collar and muzzle.

Although the present invention has been described with reference to preferred embodiments, workers skilled in the art will recognize that changes may be made in form and detail without departing from the spirit and scope of the invention.

What is claimed is:

1. A combination collar and muzzle humane training aid for dogs, comprising:

a first adjustable collar loop adapted to fit around the neck of a dog immediately behind the head of such dog and adjustable to snugly fit to prevent its slipping downwardly on the neck from its position immediately behind the head;

a first divided ring carried by said collar loop and having a center divider bar forming ring end portions, opposite ends of said collar loop being attached to the respective ring end portions to form collar side straps with said first ring forming a part of said collar loop, the first ring being positioned underneath the neck and immediately to the rear of the lower jaw of a dog on which the training aid is placed and resting flat against the throat of such dog when the collar loop is in place and adjusted;

a second muzzle loop passing through said first ring with a separate side of the muzzle loop positioned on each of the respective sides of the divider bar of the first ring and freely sliding relative to said first ring, said muzzle loop having a first loop portion extending from the first ring of size to encompass the muzzle and at least a portion of the lower jaw of a dog on which the training aid is to be used, and said muzzle loop having a second loop portion extending to the opposite side of said first ring from the first loop portion of the muzzle loop; and the second loop portion of the muzzle loop being positioned on the underside of the first ring and below the lower jaw of a dog on which the training aid is to be used, whereby a leash may be attached to the second loop portion to provide a pulling force on the muzzle loop to tighten the muzzle loop and thereby through the first ring to simultaneously exert a force on the collar loop when the training aid is installed on a dog, to provide simultaneous pressure on both the collar loop and muzzle loop in directions toward the first ring in its position underneath and immediately to the rear of the lower jaw of a dog on which the training aid is mounted.

2. The apparatus as specified in claim 1 and a pair of stabilizer members, each having first ends slidably mounted on said muzzle loop and second ends slidably mounted on the collar loop, respectively, said stabilizer members being adapted to be placed along the sides of a head of an animal on which the training aid is placed to control movement of the muzzle loop away from the collar loop at locations spaced from the ring.

3. The apparatus as specified in claim 1 wherein said first mentioned ring is an unobstructed ring, and a second ring comprising an oval ring having a center divider bar mounted on said muzzle loop with one length of the loop passing through each side of the oval ring, the second ring being positioned between the first ring and the lower side of the jaw of an animal on which the training aid is mounted.

4. The apparatus of claim 1 wherein the collar loop comprises two strap portions attached to the first ring, and adjustable closure means at the ends of the collar loop strap portions opposite from the first ring.

5. The combination collar and muzzle as claimed in claim 1 and a second leash ring freely slidably mounted over the lower loop portion of the muzzle loop below the first mentioned ring whereby a leash attached to the leash ring and when pulled provides a pulling force on the muzzle loop without a substantial tendency to cause the muzzle loop to slip and rub on the muzzle of the dog on which the training aid is placed.

6. A humane method of controlling and achieving obedient and companionable behavior of dogs comprising the steps of:
providing a collar member and placing it onto the neck of such dog immediately behind the ears and extending down to the underside of the throat and snugly attaching the collar member, said collar member having a divided ring at the center portions thereof which is positioned below and immediately to the rear of the lower jaw of such dog;
providing a muzzle loop looped over the upper portions of the muzzle and freely slidably passing through the ring on the lower side of the lower jaw of such dog, said muzzle loop being of sufficient size to fit around the muzzle when the muzzle loop is not under external forces;
providing means to apply a force on the portion of the muzzle loop that is passed through the ring of the collar loop, and on the lower side of the lower jaw of such dog in a generally forwardly direction to tighten the muzzle loop onto the muzzle of such dog and thereby simultaneously tighten the collar loop as the muzzle loop slides in said ring and to apply pressure to the jaw and through said collar loop to apply simultaneous pressure to the neck of such dog immediately behind the ears and head and along the sides of the neck without compressing the throat portion such as the trachea and larynx of such dog.

7. A combination collar and muzzle humane training aid for animals, for example dogs, comprising:
a first collar loop adapted to fit around the neck of an animal immediately behind the head of such animal and adjustable to snugly fit to prevent its slipping downwardly on the neck from its position immediately behind the head;
a first inobstructed ring carried by said collar loop;
a second muzzle loop passing through said ring and freely sliding relative to said ring, said muzzle loop having a first portion of size to encompass the muzzle and lower jaw of an animal on which the training aid is to be used, and said muzzle loop having a second portion extending to the opposite side of said first ring from the first portion, whereby a leash may be attached to provide a pulling force on the muzzle loop and through the first ring on the collar loop when the training aid is installed on an animal, to provide simultaneous pressure in directions toward the first ring positioned underneath and behind the jaw of a dog on which the training aid is mounted; and
a second ring comprising an oval ring having a center divider bar mounted on said muzzle loop with one length of the muzzle loop passing through each side of the second ring, the second ring being positioned between the first ring and the lower side of the jaw of an animal on which the training aid is mounted.

* * * * *

UNITED STATES PATENT AND TRADEMARK OFFICE
CERTIFICATE OF CORRECTION

PATENT NO. : 4,621,591

DATED : November 11, 1986

INVENTOR(S) : Robert K. Anderson et al.

It is certified that error appears in the above-identified patent and that said Letters Patent is hereby corrected as shown below:

In Column 8, line 23, please delete "inobstructed" and insert -- unobstructed --.

Signed and Sealed this

Third Day of February, 1987

Attest:

DONALD J. QUIGG

Attesting Officer

Commissioner of Patents and Trademarks